April 12, 1938.　　A. O. ESPE　　2,114,049
DISK HARROW
Filed April 8, 1937　　2 Sheets-Sheet 1
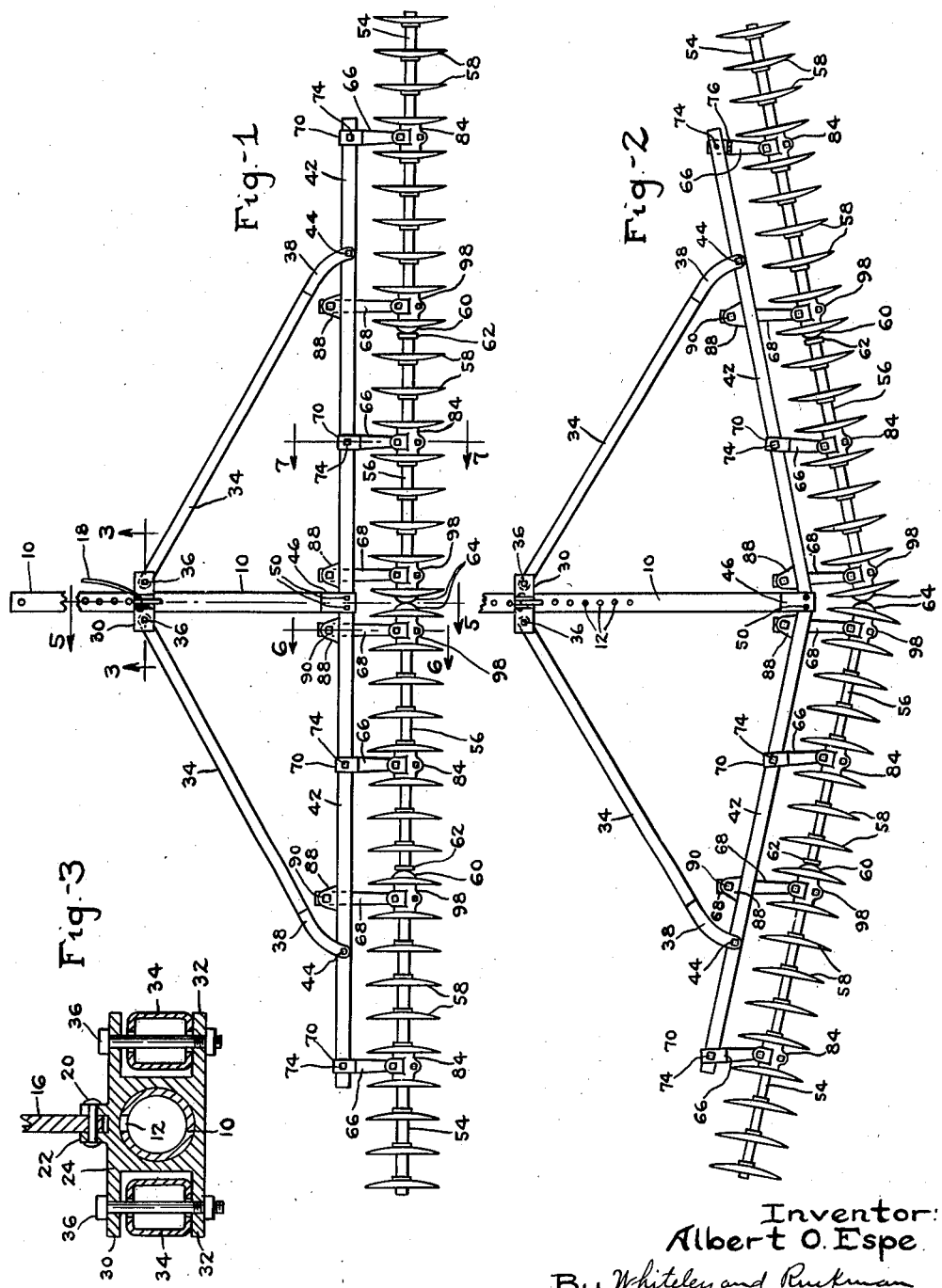
Inventor:
Albert O. Espe
By Whiteley and Ruckman
Attorneys

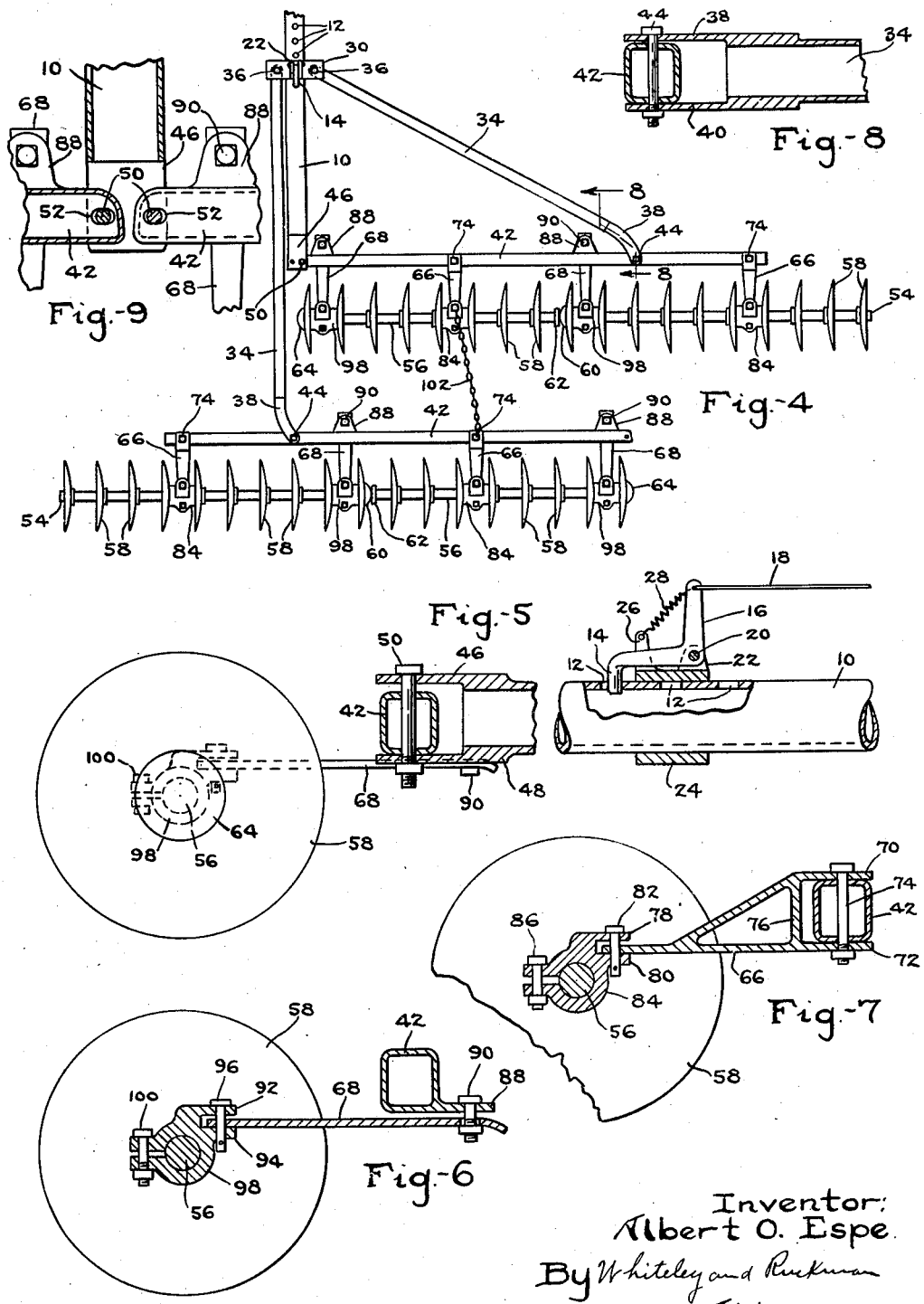

Patented Apr. 12, 1938

2,114,049

UNITED STATES PATENT OFFICE 2,114,049

DISK HARROW

Albert O. Espe, Crookston, Minn.

Application April 8, 1937, Serial No. 135,689

3 Claims. (Cl. 55—81)

My invention relates to disk harrows. An object of the invention is to provide connections of such character between the draw-bar and the disks that the latter will be readily accommodated to any unevenness of the ground without imposing undue strains upon any of the parts of the device. Another object is to provide a harrow in which the disks may be positioned axially at right angles to the draw-bar connection or adjustment may be readily made so that the disks will have various desired angular arrangements axially with relation to the draw-bar connection. Another object is to provide a harrow having provision for backing it without danger of jack-knifing and breaking of the disks. Another object is to provide a harrow in which some of the disks may be swung to position them behind other ones of the disks to adapt the device for passing through narrow places.

The novel features which I believe to be characteristic of my invention are set forth with particularity in the appended claims. The invention itself, however, both as to its organization and method of operation, together with additional objects and advantages thereof, will be best understood from the following description of a specific embodiment when read in connection with the accompanying drawings, in which—

Fig. 1 is a top plan view of the device showing the disks lined up axially at right angles to the draw-bar connection. Fig. 2 is a view similar to Fig. 1, but showing the device adjusted to bring the disks into angular arrangement axially with relation to the draw-bar connection. Fig. 3 is an enlarged sectional view on the line 3—3 of Fig. 1. Fig. 4 (Sheet 2) is a top plan view showing one-half of the disks swung partly behind the other half to adapt the device for passing through narrow places. Fig. 5 is an enlarged scetional view on the line 5—5 of Fig. 1. Fig. 6 is an enlarged sectional view on the line 6—6 of Fig. 1. Fig. 7 is an enlarged sectional view on the line 7—7 of Fig. 1. Fig. 8 is an enlarged sectional view on the line 8—8 of Fig. 4. Fig 9 is an enlarged fragmentary view showing in sectional plan the portion of the device shown in Fig. 1 at the rear end of the draw-bar connection.

Referring to the particular construction shown in the drawings for illustrative purposes, the numeral 10 designates a connecting bar to the front end of which the customary draw-bar is hitched. The bar 10 is in the form of a pipe section having a plurality of holes 12 in the upper surface thereof any one of which is adapted to receive a pin 14 as best shown in Fig. 5. The pin 14 extends downwardly from one arm of a bell crank 16 to the other arm of which is attached a flexible element 18 by means of which the bell crank 16 may be turned on its pivot 20 to pull the pin 14 out of the particular hole 12 in which it may be inserted. As shown in Fig. 3, the pivot 20 is carried by ears 22 formed on the upper surface of a casting 24 which slidably encircles the bar 10. The casting 24 carries an upstanding lug 26 which is connected by a spring 28 with the upper end of the bell crank 16 whereby the pin 14 is releasably held in the desired one of the holes 12. The ends of the casting 24 are provided with upper flanges 30 and lower flanges 32 between which, as shown in Fig. 3, the forward ends of brace bars 34 fit loosely and are pivotally attached by bolts 36 which pass loosely through these bars. The bars 34 are hollow and square in cross-section and for normal operation of the device extend diagonally rearward from both sides of the connecting bar 10. The rear ends of the bars 34, as shown in Fig. 8, carry upper flanges 38 and lower flanges 40 between which intermediate portions of transverse bars 42 are pivotally attached by bolts 44. The bars 42 are square in cross-section and their inner ends normally fit loosely between upper flanges 46 and lower flanges 48 carried by the rear end of the bar 10. These inner ends are pivotally attached by bolts 50 which, as shown in Fig. 9, pass through slots 52. The adjacent ends of the two bars 42 are slightly beveled and rounded, which permits these bars to be tilted forwardly into the position shown in Fig. 2 without interfering with each other.

Attached behind each one of the two bars 42 are two rods embodying an outer rod 54 and an inner rod 56. These four rods have disks 58 of the disk harrow secured thereto, with spacers between the disks. The inner ends of the outer rods 54 are provided with bosses 60 which butt against small disks 62 provided on the outer ends of the inner rods 56. The inner ends of the inner rods 56 are provided with bosses 64 which bear against each other. Each of the rods 54 is connected to the forwardly positioned bar 42 by a casting 66 and a strap 68 while each of the rods 56 is connected to the bar 42 by a like casting 66 and strap 68.

The construction of the castings 66 is best shown in Fig. 7. The casting 66 at its front has an upper flange 70 and a lower flange 72, these flanges straddling the bar 42 and being secured thereto by bolts 74. The flanges 70 and 72, back of the bar 42, are connected by a web 76 which serves as a stop when backing, as will be understood from the right-hand end of Fig. 2, and hence prevents jack-knifing and breaking of the disks 58. The rear of the casting 66 is straddled loosely by an upper flange 78 and a lower flange 80 and attached thereto by a bolt 82. The flanges 78 and 80 are carried by a bearing 84 surrounding the rod 56, one side of the bearing being split and adjustably held by a bolt 86. It will be understood from Figs. 1 and 2 that there is one of the castings 66 for each of the rods 56 and one of them for each of the rods 54.

The manner of attaching each of the four straps 68 is best shown in Fig. 6. The bar 42 for each strap is provided with a forwardly-extending lug 88 and a bolt 90 passing through this lug and through the forward end of the strap 68. The rear end of this strap is loosely straddled by an upper flange 92 and a lower flange 94 and attached thereto by a pin 96. The flanges 92 and 94 are carried by a bearing 98 surrounding the rod 56, one side of this bearing being split and adjustably held by a bolt 100. It will be understood from Figs. 1 and 2 that there is one of the straps 68 for each of the rods 54.

The operation and advantages of my device will be understood in connection with the foregoing description and the accompanying drawings. The loose connections which have been mentioned between the draw-bar and the rods on which the disks are mounted enable the disks to accommodate themselves to the character of the ground without likelihood of imposing any undue strains upon any of the parts of the device. By referring to Fig. 5, it will be understood that the position of the pin 14 in the holes 12 may be readily changed so that the disks may be set axially at right angles to the draw-bar as shown in Fig. 1, or may be set axially in desired angular position such as shown in Fig. 2. By referring to Figs. 2 and 7, it will be understood that the stop 76 prevents jack-knifing and danger of breaking the disks while backing the harrow.

When the device is in operation, there is a pull-in effect on the two bars 34 which is counteracted by the two bars 42. This prevents any pull-in effect on the bearings of the disks. By referring to Fig. 4, it will be understood that upon removing the bolt 50, which attaches the inner end of the left-hand bar 42, this bar, together with the brace bar 34, may be swung into the position shown in Fig. 4. In this case a chain 102 may be used to connect the bar 42 with one of the forward rods 56. It is of course obvious that the right-hand bar 42 could be similarly swung backwardly.

While I have shown four gangs of disks which include the two outer ones 54 and the two inner ones 56, it will be understood that the number of gangs may be greater if desired. With the wide disks which are shown, it is desirable that there should be flexibility between the separate gangs. Therefore I not only provide the bosses 64 at the center such as are used when there are only two gangs, but also provide the bosses 60 between all of the gangs positioned at both sides of the two center gangs. The bosses provide flexibility between each gang and also take off any end thrust against any of the bearings which reduces the friction and wear on the bearings. Although I have shown and described a specific embodiment of my invention, I am fully aware that other embodiments are possible. My invention, therefore, is not to be restricted except insofar as is necessitated by the prior art and by the spirit of the following claims.

I claim:

1. A harrow comprising a draw-bar connector, two bars pivotally attached to the rear of said connector and adapted to extend in opposite directions therefrom, brace bars connecting the forward portion of said connector with said two bars respectively, a plurality of rods behind said bars, connections between said bars and rods pivotally attached thereto, said connections embodying a stop whereby jack-knifing is prevented when backing the harrow, and disks carried by said rods.

2. A harrow comprising a draw-bar connector, two bars pivotally attached to the rear of said connector and adapted to extend in opposite directions therefrom, brace bars connecting the forward portion of said connector with said two bars respectively, a plurality of rods behind each of said bars, two connecting members between each of said rods and the bar which is in front thereof, one of said members being attached to said bar for side-wise turning movement only and being attached to said rod for both side-wise turning movement and up and down movement, the other of said members being attached to both said bar and said rod for side-wise turning movement and up and down movement, and disks carried by said rods.

3. A harrow comprising a draw-bar connector, two bars pivotally attached to the rear of said connector and adapted to extend in opposite directions therefrom, brace bars connecting the forward portion of said connector with said two bars respectively, disk gang units behind said two bars respectively, and two connecting members between each of said units and the bar which is in front thereof, one of said members being attached to said bar for sidewise turning movement only and being attached to said unit for both sidewise turning movement and up and down movement, the other of said members being attached to both said bar and said unit for sidewise turning movement and up and down movement.

ALBERT O. ESPE.